(12) United States Patent
Crocker

(10) Patent No.: US 12,486,381 B2
(45) Date of Patent: Dec. 2, 2025

(54) ACCELERATED PEROXIDE-CURED RESIN COMPOSITIONS HAVING EXTENDED OPEN TIMES

(71) Applicant: Arkema Inc., King of Prussia, PA (US)

(72) Inventor: Evan Crocker, King of Prussia, PA (US)

(73) Assignee: Arkema Inc., King of Prussia, PA (US)

( * ) Notice: Subject to any disclaimer, the term of this patent is extended or adjusted under 35 U.S.C. 154(b) by 0 days.

(21) Appl. No.: 18/527,509

(22) Filed: Dec. 4, 2023

(65) Prior Publication Data

US 2024/0117156 A1    Apr. 11, 2024

Related U.S. Application Data

(63) Continuation of application No. 16/969,576, filed as application No. PCT/US2019/017470 on Feb. 11, 2019, now Pat. No. 11,873,381.

(60) Provisional application No. 62/631,991, filed on Feb. 19, 2018.

(51) Int. Cl.
| | |
|---|---|
| *C08K 13/02* | (2006.01) |
| *B29C 70/52* | (2006.01) |
| *B29K 67/00* | (2006.01) |
| *B29K 71/00* | (2006.01) |
| *B29K 309/08* | (2006.01) |

(52) U.S. Cl.
CPC ............ *C08K 13/02* (2013.01); *B29C 70/521* (2013.01); *B29K 2067/00* (2013.01); *B29K 2071/00* (2013.01); *B29K 2309/08* (2013.01)

(58) Field of Classification Search
None
See application file for complete search history.

(56) References Cited

U.S. PATENT DOCUMENTS

| | | | |
|---|---|---|---|
| 4,380,605 A * | 4/1983 | Gallagher ......... | C08F 299/0464 525/14 |
| 2010/0069548 A1 * | 3/2010 | Jansen .................. | C08F 299/04 524/302 |

* cited by examiner

*Primary Examiner* — Yan Lan

(74) *Attorney, Agent, or Firm* — Debodhonyaa Sengupta

(57) ABSTRACT

Curable resin compositions having extended open times at ambient temperatures and short cure times at elevated temperatures are prepared using a curable resin, a combination of room-temperature-stable liquid peroxides (including at least one perketal), a promoter salt, a thiol-functionalized organic accelerator and a free radical trap. The curable resin compositions are useful in pultrusion, cure-in-place pipe and resin transfer molding applications, among others.

24 Claims, No Drawings

ACCELERATED PEROXIDE-CURED RESIN COMPOSITIONS HAVING EXTENDED OPEN TIMES

This application is a continuation of U.S. Ser. No. 16/969,576 filed Aug. 13, 2020, which is a national stage application under 35 U.S.C. 371 of PCT/US2019/017470 filed 11 Feb. 2019, which claims benefit to U.S. patent application Ser. No. 62/631,991 filed Feb. 19, 2018.

FIELD OF THE INVENTION

The present invention pertains to resin compositions which are capable of being cured using peroxides and which have an extended pot life (open time) at ambient (room) temperatures and yet can be quickly cured at higher temperatures, thereby making them particularly suitable for use in composite applications such as pultrusion, cure-in-place pipes, and resin transfer molding.

BACKGROUND OF THE INVENTION

Composites based on curable thermoset resins such as unsaturated polyester resins and reinforcing fillers such as glass or carbon fibers typically exhibit advantageous mechanical properties such as high strength and rigidity. Curing of the resins in such systems often is achieved by initiation of free radical reactions using peroxides, leading to crosslinking of the curable resin. In at least some end-use applications for such composite systems, it is desirable for the resin to cure rapidly upon heating to an elevated temperature, in order to lower production costs and increase the efficiency of a composite manufacturing operation. Heating a curable resin containing peroxide may cause the peroxide to decompose and generate free radical species, which then initiate curing of the resin, resulting in the hardening of the liquid resin and providing the improved physical properties desirable in a composite system. A composite is considered cured when the physical form and shape of the composite part is fixed at the expected utilization temperature of the composite part. At the same time, however, the curable resin/peroxide/reinforcing filler mixture should desirably have a relatively slow rate of cure at ambient (room) temperature, in order to provide sufficient time for such a mixture to be shaped into a target form.

Generally speaking, elevated temperature cures in which organic peroxides are used depend upon the thermal degradation of such organic peroxides to initiate polymerization of curable resins such as unsaturated polyester resins. In order to achieve cure times short enough to ensure reasonable cycle times, peroxides with relatively short half-lives at room temperature are used as primary initiators. Such peroxides generally are selected from peresters which must be stored at sub-ambient (freezing) temperatures due to their instability, such as t-butyl peroxyneodecanoate, or solid peroxydicarbonates such as di(2-ethylhexyl) peroxydicarbonate or di-(4-t-butylcyclohexyl) peroxydicarbonate.

While effective, such types of peroxides are not optimal as they either require freezer storage (in the case of the liquid peroxides) which may increase storage costs and safety risks or (in the case of the solid peroxides) require additional effort and costs to disperse into a curable resin and are regulated with respect to storage due to their fire code classification.

U.S. Pat. No. 5,310,826 describes accelerator compositions for the free radical polymerization and curing of unsaturated polyesters, wherein complexes of thiolic compounds with metal salts are used as accelerators. The accelerators may also include oxygen-containing compounds and may be used in combination with peroxide initiators.

U.S. Pat. No. 5,235,010 teaches accelerator compositions for curing various unsaturated resins which include a complex of a salt of certain metals with an oxygen-containing compound, wherein a thiol compound may also be present. A peroxide initiator may be employed in combination with such complexes.

U.S. Pat. Appln. Pub. No. 2011/0250373 discloses the use of nitroxides to control free radical cured resin systems in the production of thermosetting materials, wherein a radical initiator free radical polymerization initiator selected from diacyl peroxides, peresters, peroxydicarbonates and mixtures thereof may be utilized.

International Publication No. WO 2008/003496 describes a two-component composition comprising a first component and a second component, wherein the first component is a resin composition comprising an unsaturated polyester resin or vinyl ester resin, a manganese compound and a thiol-containing compound and the second component comprises hydrogen peroxide or an alkyl hydroperoxide.

SUMMARY OF THE INVENTION

The invention concerns various combinations of room-temperature-stable organic peroxides and various additives useful as initiators for the elevated temperature curing of composite systems based on curable resins such as unsaturated polyester resins. In accordance with aspects of the present invention, processes are provided that require only short cure times at elevated temperatures, while maintaining extended open times at ambient temperatures. In the context of the embodiments addressed here, cure time is defined as the period of time required for a particular resin formulation (which may be in the form of a composite formulation) to reach acceptable physical properties under a particular set of processing conditions. For example, a resin may be considered cured when its Shore D hardness as measured using an ASTM D2240 durometer at 25° C. reaches a value of at least 50. Open time is defined as the period of time a resin formulation (e.g., composite formulation) remains workable (maintains acceptable viscosity and reactivity) under a particular set of processing conditions. Curable compositions are provided which remain workable (substantially uncured) over a prolonged period of time, thus permitting forming, shaping or other physical manipulation of a composite precursor, such as a preimpregnated sheet or preimpregnated tow, obtained by combining the curable composition with a reinforcing filler such as a fiber mat or fiber strands. Peroxide systems commonly used in composite processes of this type, such as pultrusion, cured-in-place pipe, and resin transfer molding processes, often use solid peroxydicarbonates, in either powder or paste form, or liquid peroxides that require storage at low temperatures (less than normal room temperature) due to their instability. The advantages of the current invention over such known systems include the ease with which a liquid peroxide curative system can be shipped, stored, dispersed and handled, mitigating the safety and storage issues sometimes associated with the use of peroxides.

Thus, one aspect of the present invention is concerned with the development of an initiator formulation based on organic peroxides and various additives for use in composite cure processes requiring fast cures at elevated temperatures while maintaining extended open times at ambient conditions. The present invention addresses the storage, dispersion and safety issues associated with the peroxides typically used in the manufacture of cured composites based on curable resins by providing an initiation system for curable resins that can meet or exceed the cure time requirements for many applications of such curable resins using liquid peroxides capable of being stored at ambient temperatures.

The invention described herein utilizes room-temperature-stable liquid peroxides combined with certain additives that accelerate curing of a curable resin by the peroxides at elevated temperatures, but not to a substantial extent at ambient temperatures. The incorporation of promoter salts, in particular salts of transition metals such as copper, cobalt, iron and zinc, provides systems which exhibit reduced cure time as compared to unaccelerated systems. In addition, thiol compounds such as multifunctional mercapto compounds (e.g., pentaerythritol tetramercaptopropionate, PETMP) unexpectedly have been found to provide additional effective acceleration of curing. The use in combination of zinc chloride (a promoter salt) and PETMP (a thiol-functionalized organic compound) surprisingly has been discovered to be particularly effective, allowing for an unexpected reduction of the metal loading by a factor of two (to <100 ppm based on the weight of curable resin) and an almost tenfold reduction in the thiol loading (to <500 ppm) as compared to other metal systems.

High-temperature cure systems often contain several different peroxides with various half-life temperatures in order to ensure complete cure of a curable resin. Room-temperature-stable peroxyesters such as t-butyl peroxybenzoate are commonly used as finishers to ensure complete cure of a curable resin and to minimize residual (unreacted) monomer in the cured system thereby obtained. In the present invention, it has been unexpectedly found that perketals such as 1,1-di(t-amylperoxy)cyclohexane and 1,1-di(t-butylperoxyl) cyclohexane are not accelerated nearly as much as peroxyesters are by the additive formulations of the present invention. Thus, the combination of both peroxyester and perketal in a peroxide/additive formulation provides a curable resin composition that is capable of exhibiting cure times, open times and residual monomer levels (following curing) which are similar to conventionally-initiated systems for use in pultrusion, cured-in-place pipe and other such composite applications which are based on solid peroxides and/or peroxides which must be freezer stored.

Composite processes such as pultrusion and cured-in-place pipe that require fast cure times at elevated temperature generally also require long open times at ambient temperatures. The combination of promoter salt (such as zinc chloride) and thiol-functionalized organic compound (e.g., PETMP) as described herein effectively accelerates peroxide cure at elevated temperature, but also promotes cure at ambient temperature such that open time is reduced. It has now been found that incorporating a free radical trap, such as a nitroxide radical, in the curable resin composition effectively extends open times to useful and desirable levels (e.g., ≥8 hours) under normal ambient conditions, without interfering with the ability to quickly cure the curable resin composition upon heating to an elevated temperature.

Accordingly, the present invention provides a curable resin composition comprised of:
 a) at least one curable resin;
 b) at least one room-temperature-stable organic peroxide, other than a perketal, which is liquid at 25° C.;
 c) at least one room-temperature-stable perketal which is liquid at 25° C.;
 d) at least one salt of at least one metal selected from the group consisting of Li, Al, Mg, Co, Fe, Cu, Zn, Ni, Mn, Cr, Sn, Au, Pd and Pt;
 e) at least one thiol-functionalized organic compound; and
 f) at least one free radical trap.

DETAILED DESCRIPTION OF THE INVENTION

Curable Resins

Suitable curable resins which may be utilized in the present invention include, but are not limited to, alkyd resins, unsaturated polyester (UP) resins, vinyl ester resins, (meth)acrylate resins (also referred to as acrylic resins), and mixtures thereof. Preferred resins include (meth)acrylate resins, UP resins and vinyl ester resins. In the context of the present application, the terms "unsaturated polyester resin" and "UP resin" refer to combinations of unsaturated polyester resin(s) and ethylenically unsaturated monomeric compound(s) such as styrene, which are typically used to lower the viscosity of the (uncured) unsaturated polyester resin and to facilitate crosslinking and development of physical properties useful to cured composite articles. Unsaturated polyester resins are condensation polymers typically formed by the reaction of polyols (also known as polyhydric alcohols) with saturated and/or unsaturated dibasic acids. The term "(meth)acrylate resin" refers to combinations of acrylate and/or methacrylate resins and ethylenically unsaturated monomeric compounds. Such UP resins and acrylate resins are well known in the art and commercially available.

Unsaturated polyester resins useful in this invention comprise reactive resins dissolved in a polymerizable monomer or mixture of monomers. These reactive resins are formed by condensing a saturated dicarboxylic acid or anhydride and an unsaturated dicarboxylic acid or anhydride with a dihydric alcohol. Examples of these polyester resins include the products of the reaction of a saturated dicarboxylic acid or anhydride (e.g., phthalic anhydride, isophthalic acid, tetrahydrophthalic anhydride, hexahydrophthalic anhydride, endomethylene tetrahydrophthalic anhydride, tetrachlorophthalic anhydride, hexachloroendomethylene tetrahydrophthalic acid, succinic acid, glutaric acid, adipic acid, pimelic acid, suberic acid, azelaic acid or sebacic acid) and an unsaturated dicarboxylic acid or anhydride (e.g., maleic anhydride, fumaric acid, chloromaleic acid, itaconic acid, citraconic acid or mesaconic acid) with a dihydric alcohol (e.g., ethylene glycol, propylene glycol, butylene glycol, diethylene glycol, triethylene glycol or neopentyl glycol). Small amounts of a polyhydric alcohol (e.g., glycerol, pentaerythritol, trimethylopropane or sorbital) may be used in combination with the glycol.

The final three-dimensional (crosslinked) structure may be produced by reacting the unsaturated polyester through the unsaturated acid component of the unsaturated polyester with an unsaturated monomer which is capable of reacting with the unsaturated polyester to form cross-linkages. Suitable unsaturated monomers include styrene, methylstyrene, dimethylstyrene, vinyltoluene, divinylbenzene, dichlorostyrene, methyl acrylate, methyl methacrylate, ethyl acrylate, diallyl phthalate, vinyl acetate, triallyl cyanurate, acrylonitrile, acrylamide and mixtures thereof. The relative amounts of the unsaturated polyester and the unsaturated monomer in the unsaturated polyester resin composition may be varied over a wide range. The unsaturated polyester resin compositions generally contain 20% to 80% by weight of the monomer, the monomer content preferably being in the range from 30% to 70% by weight.

Alkyd resins include resins which are the polymerization products of polyhydric alcohols and polybasic acids modified with monobasic fatty acids, typically including at least some amount of unsaturated fatty acids. The polybasic acid may be a dicarboxylic acid, most usually being represented by phthalic anhydride, isophthalic acid, maleic anhydride, itaconic acid and others. Mixtures of two or more of the acids (or their anhydrides) may also be used. A second acid component is monocarboxylic and is represented by the drying oil acids, such as linoleic acid, linolenic acid, elaeostearic acid, and others containing two or more double bonds in carbon to carbon conjugation or in non-conjugate relationship with each other.

Vinyl ester resins include resins prepared by esterification of epoxy resins with unsaturated carboxylic acids such as acrylic acid and methacrylic acid, with the resulting product then dissolved in a reactive solvent such as styrene (typically to a concentration of 35 to 45 percent by weight).

(Meth)acrylate resins include acrylate and/or methacrylate-functionalized substances such as acrylates; methacrylates; diacrylates; and dimethacrylates; higher functionality acrylates and methacrylates, including both monomers and oligomers; as well as combinations thereof.

Non-limiting examples of suitable ethylenically unsaturated monomeric compounds include styrene and styrene derivatives like α-methyl styrene; vinyl toluene; indene; divinyl benzene; vinyl pyrrolidone; vinyl siloxane; vinyl caprolactam; stilbene; but also diallyl phthalate; dibenzylidene acetone; allyl benzene; methyl methacrylate; methyl acrylate; acrylic acid; methacrylic acid; diacrylates; dimethacrylates; acrylamides; vinyl acetate; triallyl cyanurate; triallyl isocyanurate; allyl compounds (such as (di) ethylene glycol diallyl carbonate); chlorostyrene; tert-butyl styrene; tert-butylacrylate; butanediol dimethacrylate; and mixtures thereof. Suitable examples of (meth)acrylate-reactive diluents are PEG200 di(meth)acrylate; 1,4-butanediol di(meth)acrylate; 1,3-butanediol di(meth)acrylate; 2,3-butanediol di(meth)acrylate; 1,6-hexanediol di(meth)acrylate and its isomers; diethyleneglycol di(meth)acrylate; triethyleneglycol di(meth)acrylate; glycerol di(meth)acrylate; trimethylolpropane di(meth)acrylate; neopentyl glycol di(meth) acrylate; dipropyleneglycol di(meth)acrylate; tripropyleneglycol di(meth)acrylate; PPG250 di(meth)acrylate; tricyclodecane dimethylol di(meth)acrylate; 1,10-decanediol di(meth)acrylate; tetraethylene glycol di(meth) acrylate; trimethylolpropane tri(meth)acrylate; glycidyl (meth)acrylate; (bis)maleimides; (bis)citraconimides; (bis) itaconimides; and mixtures thereof.

The amount of ethylenically unsaturated monomer in a curable resin employed in accordance with the present invention is preferably at least 0.1 wt %, based on the weight of the curable resin component, more preferably at least 1 wt %, and most preferably at least 5 wt %. The amount of ethylenically unsaturated monomer is preferably not more than 50 wt %, more preferably not more than 40 wt %, and most preferably not more than 35 wt %.

Examples of commercially available unsaturated polyester resins suitable for the applications addressed in this invention include Pultru® resins from AOC; COR31 and COR30 resins from Interplastic; Aropol® resins from Ashland; and DION resins from Reichold.

Examples of commercially available vinyl ester resins suitable for the applications addressed in this invention include Pultru® resins from AOC; CORVE resins from Interplastic; and Derakane® resins from Ashland, Examples of commercially available (meth)acrylate resins suitable for the applications addressed in this invention include MODAR® from Ashland and Elium® from Arkema.

Organic Peroxides

The curable resin compositions of the present invention are characterized by the inclusion of at least two different types of organic peroxides: a) at least one room-temperature-stable organic peroxide, other than a perketal, which is liquid at 25° C.; and b) at least one room temperature-stable perketal which is liquid at 25° C. Thus, the organic peroxide formulations of the present invention, which may be a blend or mixture or emulsion of two or more organic peroxides, are liquid at room temperature. Since the formulations of the invention are room temperature stable, no refrigeration may be necessary for storage thereby rendering them easier to transport, handle, and store.

Utilizing organic peroxides which are liquid at 25° C. greatly facilitates the formulation and handling of the curable resin composition. According to certain embodiments, the curable resin composition comprises little to no organic peroxide which is solid at 25° C. For example, the curable resin composition may comprise less than 2000 ppm, 1000 ppm, 500 ppm, less than 400 ppm, less than 300 ppm, less than 200 ppm, less than 100 ppm, less than 50 ppm or even 0 ppm in total of organic peroxide which is solid at 25° C.

In addition to being liquid at 25° C., both types of organic peroxides employed in the curable resin composition are room-temperature-stable peroxides. In the context of the present invention, "room-temperature-stable" means an organic peroxide which, in purified form, has a recommended maximum storage temperature of 30° C. or higher.

According to certain aspects of the invention, however, the room-temperature-stable organic peroxides which are liquid at 25° C. and present in the curable resin composition have a ten hour half-life temperature of 80° C. or more. According to still further aspects, the room-temperature-stable organic peroxides exhibit not more than 2% loss in peroxide concentration after being stored for 3, 6, 9 or more months at 25° C.

In preferred embodiments, the curable resin composition contains little or no organic peroxide which is not mom-temperature stable. For example, the curable resin composition may comprise less than 2000 ppm, 1000 ppm, 500 ppm, less than 400 ppm, less than 300 ppm, less than 200 ppm, less than 100 ppm, less than 50 ppm or even 0 ppm in total of organic peroxide that is not room-temperature-stable.

The curable resin composition desirably contains an amount of organic peroxide in total that is effective to achieve substantially complete curing (polymerization) of the curable resin present in the curable resin composition under the curing conditions selected. Such amount may vary substantially depending upon the organic peroxides selected, the components of the activator system (e.g., the particular promoter salt(s) and thiol-functionalized organic compound(s) present and their relative amounts), the reactivity of the curable resin, and the curing profile desired, among other parameters. Generally speaking, however, the curable resin composition may, in various embodiments of the invention, be advantageously comprised of at least 0.05%, at least 0.1%, at least 0.15%, at least 0.2%, at least 0.25%, at least 0.3%, at least 0.35%, or at least 0.4% by weight in total of organic peroxide based on the weight of curable resin. An advantage of the present invention is that, due to the accelerating effect of the promoter salt(s) and thiol-functionalized organic compound(s) when used in combination, relatively low amounts of organic peroxide can be used, in at least certain embodiments of the invention. Thus, the curable resin composition may comprise not more than 2%, not more than 1.5%, not more than 1%, or not more than 0.5% by weight in total of organic peroxide based on the weight of curable resin. However, in other embodiments the curable resin composition may comprise more than 2% by weight in total of organic peroxide based on the weight of curable resin.

The weight ratio of room-temperature-stable liquid organic peroxides other than perketals to room-temperature-stable liquid perketals may be varied as may be desired in order to provide the curable resin composition with a target cure profile. For example, such weight ratio may be from 4:1 to 1:2, although higher or lower weight ratios could also be used.

Room-Temperature-Stable Liquid Organic Peroxides Other Than Perketals

Suitable room-temperature-stable organic peroxides, other than perketals, which are liquid at 25° C. include, in particular, peresters (also referred to as "peroxyesters"). Preferred examples of such peresters include, but are not limited to, t-butyl peroxybenzoate; t-amyl peroxybenzoate; t-butyl peroxyacetate: t-amyl peroxyacetate; t-butyl peroxy-3,5,5-trimethylhexanoate; and t-amyl peroxy-3,5,5-trimethylhexanoate. Certain peroxycarbonates which are liquid at 25° C. may also be used, such as OO-(t-butyl) 0-isopropyl monoperoxycarbonate; OO-(t-butyl) O-(2-ethylhexyl) monoperoxycarbonate; OO-(t-amyl) O-(2-ethylhexyl) monoperoxycarbonate; and polyether poly-t-butylperoxy carbonate.

Most preferred peroxides other than perketals include OO-(t-butyl) O-(2-ethylhexyl) monoperoxycarbonate and OO-(t-amyl) O-(2-ethylhexyl) monoperoxycarbonate.

As will be explained in more detail subsequently, the above-mentioned room-temperature-stable organic peroxides may function as primary initiators in the curable resin composition, with the perketals functioning as finisher initiators.

Room-Temperature-Stable Liquid Perketals

Suitable room-temperature-stable perketals (which are also referred to as "peroxyketals") which are liquid at 25° C. include, but are not limited to, 1,1-di(t-amylperoxy)-cyclohexane, 1,1-di(t-butylperoxy)-cyclohexane, 1,1-di(t-butylperoxy)-3,3,5-trimethylcyclohexane, 1,1-di(t-amylperoxy)-3,3,5-trimethylcyclohexane, ethyl 3,3-di(t-amylperoxy) butyrate, and n-butyl 4,4-di(t-butylperoxy)valerate.

Most preferred perketals include 1,1-di(t-amylperoxy)-cyclohexane and 1,1-di(t-butylperoxy)-cyclohexane.

According to one aspect of the present invention, the perketal or perketals present in the curable resin composition function as "finishers". That is, it or they begin to be activated (i.e., decompose) at a temperature higher than the temperature at which the other (primary) organic peroxide(s) is or are activated and/or have a longer activation time at a given temperature than the other (primary) organic peroxide(s), thereby completing the curing. Thus, in such a system, the organic peroxide(s) other than a perketal which comprise(s) part of the curable resin composition, function as a primary initiator or primary initiators. As the temperature of the curable resin composition is increased, the primary organic peroxide(s) begin to decompose at a significant rate before the perketal(s), or their decomposition is preferentially accelerated by the combination of promoter salt(s) and thiol-functionalized organic compound(s). A first stage of curing thus is achieved by action of the primary organic peroxide(s), wherein at least some portion of the curable resin remains uncured by the time the primary organic peroxide(s) is or are substantially decomposed. Further curing of the curable resin composition is achieved upon further heating through the action of the (finisher) perketal(s), the decomposition of which is slower or less actively promoted by the promoter salt/thiol-functionalized organic compound combination than the primary peroxide(s).

Promoter Salts

One or more promoter salts are present in the curable resin compositions of the present invention. Such salts promote or activate the decomposition of one or more of the organic peroxides present in the curable resin composition, thereby accelerating the curing of the curable resin composition by the organic peroxides. Without wishing to be bound by any particular theory, it is believed that such promoter salts may react with the thiol-functionalized organic compound(s) also present in the curable resin composition to form complexes which are actually the species responsible for accelerating cure at elevated temperatures, or that the thiol may otherwise assist peroxide decomposition and resin curing.

Suitable promoter salts include salts of metals selected from the group consisting of Li, Al, Mg, Co, Fe, Cu, Zn, Ni, Mn, Cr, Sn, Au, Pd and Pt. The anionic portion of the salt may be a halide, nitrate, sulfate or carboxylate (e.g., lactate, acetate, hexanoate, naphthenate), for example. Halide salts, in particular chloride salts, are especially preferred.

According to certain embodiments of the invention, the at least one promoter salt may include at least one transition metal halide. In particularly preferred aspects, the at least one promoter salt includes at least one zinc halide, such as zinc chloride. Zinc chloride is a particularly preferred promoter salt for use in the present invention.

Typically, the curable resin composition will comprise an amount of promoter salt effective to reduce the cure time of the curable resin composition as compared to the cure time observed in the absence of promoter salt. Such an amount will vary depending upon a number of factors, but in various embodiments of the invention promoter salt is present in an amount which provides at least 5, 10, 20, 30, 40 or 50 ppm in total of the metal(s) selected from the group consisting of Li, Al, Mg, Co, Fe, Cu, Zn, Ni, Mn, Cr, Sn, Au, Pd and Pt, based on the weight of curable resin in the curable resin composition. In other embodiments, the curable composition contains promoter salt(s) in an amount to provide not more than 500, 400, 300, 200 or 100 ppm of such metal(s) in the curable resin composition, based on the weight of curable resin.

Thiol-Functionalized Organic Compounds

The curable resin compositions of the present invention comprise at least one thiol-functionalized organic compound. Such thiol-functionalized organic compounds may be characterized as organic compounds comprised of at least one thiol (—SH) functional group per molecule that are capable of increasing the rate at which the curable resin composition is cured when used in accordance with the invention. According to certain embodiments of the invention, the at least one thiol-functionalized organic compound includes at least one thiol-functionalized organic compound comprised of two or more thiol functional groups per molecule. The thiol group(s) in the thiol-functionalized organic compound in one embodiment of the invention may be an aliphatic thiol group or aliphatic thiol groups (wherein each thiol group is attached to an aliphatic carbon atom). In still further embodiments, the thiol group(s) is a primary aliphatic thiol group or are primary aliphatic thiol groups. The at least one thiol-functionalized organic compound may include at least one α-mercaptoacetate or β-mercaptopropionate ester of an alcohol. The alcohol may be a polyalcohol containing two or more hydroxyl groups per molecule, such as a glycol: trimethylolpropane; pentaerythritol; or the like. Illustrative examples of suitable thiol-functionalized organic compounds include dipentene dimercaptan; ethylcyclohexyldimercaptan; ethylene-1,2-bis-3-mercaptoacetate; ethylene-1,2-bis-3-mercaptopropionate; 1,2,3-propanetrithiol; 1,2,6-hexanetrithiol; pentaerythritolthiol; pentaerythritoltetramercaptoacetate; pentaerythritoltetramercaptopropionate; trimethylol propane tris(3-mercaptopropionate); 1,1,1-propanetriyl tris(mercaptoacetate); and thiolic derivatives of the formula: R—(R'—CH(OH)—CH$_2$—SH)$_n$ wherein R is a linear alkyl group having 3-30 carbon atoms, R' is a linear alkylene group having 3-30 carbon atoms and n is an integer of 2-6. Thiol-functionalized organic compounds suitable for use in the present invention also include any of the thiolic compounds disclosed in U.S. Pat. No. 5,310,826, the entire disclosure of which is incorporated herein by reference for all purposes. Combinations of two or more different thiol-functionalized organic compounds may be used.

Most preferred thiol-functionalized organic compounds include trimethylolpropane tris(3-mercaptopropionate); pentaerythritoltetramercaptopropionate; and 1,1,1-propanetriyl tris-(mercaptoacetate).

The amount of thiol-functionalized organic compound present in the curable resin composition may be varied as desired or needed depending upon the activity of the thiol-functionalized organic compound(s), the type and reactivity of the other components of the curable resin composition, the cure profile desired, and other factors. However, generally speaking, the curable resin composition may be comprised of at least 0.005%, at least 0.01% or at least 0.02% by weight but not more than 2%, not more than 1% or not more than 0.5% by weight, in total, of thiol-functionalized organic compound, based on the weight of curable resin in the curable resin composition.

The weight ratio of metal salt to thiol-functionalized organic compound may be varied as appropriate or desired depending upon a number of factors, including the particular metal salt(s) and thiol-functionalized organic compound(s) used and the target cure profile of the curable resin composition. According to certain non-limiting aspects of the invention, however, this weight ratio may vary from 1:1 to 1:10.

Free Radical Traps

The curable resin compositions of the present invention additionally comprise at least one free radical trap (which may also sometimes be referred to as a free radical inhibitor or a free radical scavenger). For purposes of this invention, a free radical trap is defined as a substance that reacts reversibly or irreversibly, or generates a species that reacts reversibly or irreversibly, with a free radical, with the net effect of extending the open time of the curable resin composition or slowing the polymerization of the curable resin. The presence of one or more free radical traps in the curable resin composition helps to extend the open time of the curable resin composition at ambient temperatures. For example, one or more free radical traps may be included in the curable resin composition in a total amount effective to provide an open time of at least 1-, 2-, 3-, 4-, 5-, 6-, 7-, 8-, 9- or 10 hours at 25° C. Examples of suitable free radical traps that may be used in accordance with various aspects of the present invention include, but are not limited to, nitroxide living free radicals and hydroquinones.

Non-limiting examples of free radical traps include TEMPO free radicals (2,2,6,6-tetramethyl-1-piperidinyloxy free radicals); SG-1 free radicals (nitroxide, 1-(diethoxyphosphinyl)-2,2-dimethylpropyl 1,1-dimethylethyl free radicals); slow-polymerizing monomers; alpha methyl styrene dimer; methoxyallylphenyl allylether (MAPAE); diethylhydroxyl amine (DEHA); quinone compounds; hindered phenol antioxidant type radical scavengers; and combinations thereof. The free radical traps may be used alone or in combination.

Nitroxide living free radicals may include, but are not limited to, SG-1 free radical; 4-OH TEMPO free radical; TEMPO free radicals; PROXYL free radicals (2,2,5,5-tetramethyl-1-pyrrolidinyloxy free radicals); and combinations thereof.

TEMPO free radicals and their derivatives may include, for example, 4-hydroxy TEMPO free radical (4-hydroxy-2,2,6,6-tetramethyl-1-piperidinyloxy free radical); TEMPO-polymer bound or PS-TEMPO free radicals; 4-(2-bromoacetamido)-TEMPO free radical: 4-(2-iodoacetamido)-TEMPO free radical; 4-acetamido-TEMPO free radical; 4-amino-TEMPO free radical: 4-carboxy-TEMPO free radical; 4-hydroxy-TEMPO benzoate free radical; 4-maleimido-TEMPO free radical; 4-methoxy-TEMPO free radical; 4-oxo-TEMPO free radical; 4-phosphonooxy-TEMPO hydrate free radical; and combinations thereof.

PROXYL free radicals and their derivatives may include, for example, 3-(2-iodoacetamido)-PROXYL free radical; 3-[2-(2-maleimidoethoxy)ethylcarbamoyl]-PROXYL free radical; 3-carbamoyl-PROXYL free radical; 3-cyano-PROXYL free radical; 3-maleimido-PROXYL free radical: 3-(2-bromo-acetoamido-methyl)-PROXYL free radical; 3-(2-(2-iodoacetamido)acetamido)-PROXYL free radical; 3-(2-isothiocyanato-ethyl-carbamoyl)-PROXYL free radical; 3-(3-(2-iodoacetamido)-propyl-carbamoyl)-PROXYL free radical; and combinations thereof.

Other nitroxide-based free radicals that may be used in accordance with various embodiments of the present invention include, for example, 16-doxyl-stearic acid methyl ester free radical: 2,2,3,4,5,5-hexamethyl-3-immidazolinium-1-yloxy methyl sulfate free radical; 2,2,6,6-tetramethyl-4-(methylsulfonyloxy)-1-piperidinooxy free radical; 4-(1-hydroxy-1-methylethyl)-2,2,5,5-tetramethyl-3-imidazolinium-1-yloxy free radical; 4-phenacylidene-2,2,5,5-tetramethylimidazolidazolidin-1-yloxy free radical; 4-phenyl-2,2,5,5-tetramethyl-3-imidazolin-1-yloxy free radical; 5-doxyl-stearic acid free radical (2-(3-carboxypropyl)-4,4-dimethyl-2-tridecyl-3-oxazolidinyloxy free radical); methyl 5-doxyl free radical (2-(4-methoxy-4-oxobutyl)-4,4-dimethyl-2-tridecyl-3-oxazolidinyloxy free radical); 1-hydroxy-2,2,4,6,6-pentamethyl-4-piperidinyl-3,5-di-tert-butyl-4-hydroxybenzoate free radical; 1-hydroxy-2,2,5,5-tetramethyl-2,5-dihydro-1H-pyrrole-3-carboxylic acid free radical; 4-[(1-hydroxy-2,2,6,6-tetramethyl-4-piperidinyl)oxalate free radical; tris(I-hydroxy-2,2,4,6,6-pentamethyl-4-piperidinyl)phosphoinetricarboxylate free radical; CYPMPO free radical (5-(2,2-dimethyl-1,3-propoxycyclophosphoryl)-5-methyl-1-pyrroline N-oxide free radical); and mixtures thereof.

Non-nitroxide types of living free radical compounds may also be used. Non-limiting examples of non-nitroxide type free radicals include 3-beta-doxyl-5-alpha-cholestane free radical, galvinoxyl free radical (also known as 2,6-di-tert-butyl-alpha-(3,5-di-tert-butyl-4-oxo-2,5-cyclohexadien-1-ylidene)-para-tolyloxy free radical), and mixtures thereof.

Exemplary free radical traps may also include slow polymerizing monomers. As used herein, the phrase "slow-polymerizing monomer" refers to a monomer that reacts at a slower rate than the primary polymerization monomer in a resin formulation. As an example, the reaction rate of alpha methyl styrene is significantly slower than styrene and could potentially be used as a radical trap in a styrene-based resin. Slow-polymerizing monomers may additionally include, for example, dibutyl maleate; allyl malonic ester; nonyl maleate ester, and diethyl fumarate.

Quinone-type free radical traps that may be used in accordance with embodiments of the present invention include, for example, quinone; hydroquinone; and phenol or catechol type of free radical traps. Non-limiting examples of quinone-type free radical traps include p-benzoquinone; hydroquinone (1,4-benzenediol or 1,4-dihydroxybenzene); hydroquinone monomethyl ether (4-hydroxyanisole, MEHQ, or 4-methoxyphenol); hydroquinone monomethyl ether, hydroquinone monophenyl ether; MTBHQ (mono-t-butyl hydroquinone); di-t-butyl hydroquinone; di-t-amyl hydroquinone; toluhydroquinone; p-benzoquinone; p-benzoquinone dioxime; 2,6-dichloro-1,4-benzoquinone; 2,3,5, 6-tetramethyl-1,4-benzoquinone; 2,5-dichloro-3,6-dihydroxy-p-benzoquinone; methyl-p-benzoquinone; 6-anilinoquinoline-5,8-quinone; pyrroloquinoline quinone; 2-allyl-6-methoxybenzo-1,4-quinone; quinhydrone (hydroquinone:benzoquinone 1:1 complex); 2,5-bis(morpholinomethyl)hydroquinone; 2-phenylhydroquinone; 1,2,4-benzenetriol (hydroxyhydroquinone); 4-mercaptophenol; bromohydroquinone; chlorohydroquinone; pyrocatechol (1,2-benzenediol or 1,2-dihydroxybenzene or catechol); tert-butyl catechol; resorcinol (1,3-benzenediol); and combinations thereof. Hindered phenol antioxidants may be used alone or in combination with other free radical traps disclosed herein. Non-limiting examples of hindered phenol antioxidants include compounds containing aromatic compounds containing at least one tertiary butyl group attached to a ring carbon adjacent to a ring carbon to which a hydroxyl group is attached. Exemplary hindered phenol antioxidants include BHT (butylated hydroxytoluene); BHA (butylated hydroxyanisole); Irganox® 1010, a phenolic based antioxidant and Irganox® 1076, a monofunctional hindered phenolic, both of which are available from CIBA; and Ethanox® 703 (2,6-di-tertiary-butyl-N,N-dimethyl-amino-p-cresol), an antioxidant available from Albermarle Corp.

Other free radical traps that may be used, include, for example, triethanol amine; various alcohols: amines (e.g., diethylhydroxyl amine); other hydroxyalkylamines; bioflavonoids: and unsaturated molecules possessing very easily extractable hydrogens (e.g., allylic hydrogens and tertiary hydrogens, such as methoxyallylphenyl allylether, alpha methyl styrene; alpha methyl styrene dimer; dibutyl maleate; allyl malonic ester; various mono-allylic compounds: nonyl maleate ester; and diethyl fumarate). Examples of bioflavonoids include, for example, naringenin; tocopherols; and tocotrienols. Tocopherols are a class of methylated phenolic chemical compounds containing a chromane (benzodihydropyran) ring with a hydroxyl group and a hydrophobic side chain: tocopherols typically have saturated side chains, while tocotrienols typically possess multiple sites of unsaturation in their side chains. Both tocopherols and tocotrienols are considered generally regarded as safe, and are present in many vegetable oils, nuts, seeds, and whole grains, and many have vitamin E activity.

According to at least one embodiment, the free radical trap is a hydroquinone, such as mono-tert-butyl hydroquinone.

The amount of free radical trap in the curable composition may be adjusted as appropriate to achieve the curing characteristics and profile (including open time) that may be desired. Advantageously, however, the total amount of free radical trap may typically be in the range of from 0.001% to 1% by weight, based on the weight of curable resin.

Preferred free radical traps for unsaturated polyester resins and vinyl ester resins include the TEMPO type and SG-1 persistent radicals.

The most preferred free radical traps for acrylate resins are the TEMPO type persistent radicals.

Other Components

The above-mentioned curable resins, peroxides, promoter salts, thiol-functionalized organic compounds and free radical traps can be combined with any of the other additives conventionally used in the cured-resin art, such as fillers, fibers, pigments, phlegmatizers, inhibitors (e.g., inhibitors of oxidative, thermal and/or ultraviolet degradation), lubricants, thixotropic agents, co-agents and promoters.

Examples of suitable fibers include glass fibers, carbon fibers, polymeric fibers (e.g., aramid fibers), natural fibers and the like and combinations thereof. The fibers may be in any suitable form, including in the form of mats, tows and other such forms known in the art.

Examples of suitable fillers include quartz, sand, silica, aluminum trihydroxide, magnesium hydroxide, chalk, calcium hydroxide, clays, carbon black, titanium dioxide and lime, as well as organic fillers such as thermoplastics and rubbers.

Formulation of Curable Resin Compositions

Preparation of the curable resin compositions in accordance with the present invention may be carried out using any suitable method. For example, at least one curable resin; at least one room-temperature-stable organic peroxide, other than a perketal, which is liquid at 25° C.; at least one room-temperature-stable perketal which is liquid at 25° C.; at least one salt of at least one metal selected from the group consisting of Li, Al, Mg, Co, Fe, Cu, Zn, Ni, Mn, Cr, Sn, Au, Pd and Pt; at least one thiol-functionalized organic compound; and at least one free radical trap may be combined at about room temperature (e.g., 20° C. to 30° C.) to form a liquid and/or flowable curable resin composition, which is thereafter heated to a temperature effective to cure the curable resin composition.

Alternatively, it is also possible to pre-mix certain of the ingredients of the curable resin composition to provide separate storage-stable components, which are then combined when it is desired to prepare the curable resin composition and to use the curable resin composition to produce a cured composition from the curable resin composition.

For example, one embodiment of the present invention provides a system useful as a curing system for a curable resin. Such a system may comprise a first component and a second component. The first component may comprise at least one room-temperature-stable organic peroxide, other than a perketal, which is liquid at 25° C.; at least one room-temperature-stable perketal which is liquid at 25° C.; and, optionally, at least one free radical trap. The second component may comprise at least one salt of at least one metal selected from the group consisting of Li, Al, Mg, Co, Fe, Cu, Zn, Ni, Mn, Cr, Sn, Au, Pd and Pt; at least one thiol-functionalized organic compound; and, optionally, at least one free radical trap. The second component may be formulated in the form of a solution, wherein a solvent or combination of solvents is used to dissolve the promoter salt(s) and the thiol-functionalized organic compound(s). To prepare a curable resin composition, the first component and second component are combined with a third component comprising at least one curable resin and, optionally, at least one free radical trap, in the desired proportions. At least one of the first, second or third component contains at least one free radical trap.

In another embodiment of the present invention, the curable resin(s), promoter salt(s), thiol-functionalized organic compound(s) and, optionally, free radical trap(s) are pre-mixed days or weeks before the addition of the peroxides (and, optionally, free radical trap(s)) to form a curable resin composition and, consequently, the start of the actual curing process. This allows the commercial-scale production and sale of a composition which already contains a promoter/accelerator system and which only needs to be combined with the peroxides as described herein to provide the curable resin composition of the present invention.

Also contemplated by the present invention are two-component systems comprising a first component and a second component, wherein the first component comprises at least one pre-accelerated curable resin (a combination of at least one curable resin, at least one promoter salt, at least one thiol-functionalized organic compound and at least one free radical trap) and the second component comprises a mixture of the different organic peroxides used in the present invention. As used herein, the term "two-component system" refers to systems where two components (A and B) are physically separated from each other (for instance, in separate cartridges, compartments, totes, drums or other containers), wherein components A and B are physically combined (admixed) at the time the system is to be used to form a cured resin.

In particularly preferred embodiments of the invention, a curable resin composition is provided which comprises, consists essentially of or consists of:
 a). at least one unsaturated polyester resin;
 b). at least one room-temperature-stable organic peroxide, other than a perketal, which is liquid at 25° C. and which is selected from the group consisting of t-butyl peroxybenzoate; t-amyl peroxybenzoate; t-butyl peroxyacetate; t-amyl peroxyacetate; t-butyl peroxy-3,5,5-trimethylhexanoate; t-amyl peroxy-3,5,5-trimethylhexanoate; OO-(t-butyl) O-isopropyl monoperoxycarbonate; OO-(t-butyl) O-(2-ethylhexyl) monoperoxycarbonate; OO-(t-amyl) O-(2-ethylhexyl) monoperoxycarbonate; and polyether poly-t-butylperoxy carbonate (in particular, OO-(t-butyl) O-(2-ethylhexyl) monoperoxycarbonate and/or OO-(t-amyl) O-(2-ethylhexyl) monoperoxycarbonate);
 c). at least one room-temperature-stable perketal which is liquid at 25° C. and which is selected from the group consisting of 1,1-di(t-amylperoxy)-cyclohexane, 1,1-di(t-butylperoxy)-cyclohexane, 1,1-di(t-butylperoxy)-3,3,5-trimethylcyclohexane, 1,1-di(t-amylperoxy)-3,3,5-trimethylcyclohexane, ethyl 3,3-di(t-amylperoxy) butyrate, and n-butyl 4,4-di(t-butylperoxy)valerate (in particular, 1,1-di(t-amylperoxy)-cyclohexane and/or 1,1-di(t-butylperoxy)-cyclohexane);
 d). at least one zinc halide (in particular, zinc chloride);
 e). at least one thiol-functionalized organic compound which is an α-mercaptoacetate or β-mercaptopropionate ester of an alcohol (in particular, at least one thiol-functionalized organic compound selected from the group consisting of trimethylolpropane tris(3-mercaptopropionate); pentaerythritoltetramercaptopropionate; and 1,1,1-propanetriyl tris-(mercaptoacetate); and
 f). at least one free radical trap which is a nitroxide radical (in particular, a nitroxide radical selected from the group consisting of SG-1 free radicals and TEMPO free radicals).

Uses of Curable Resin Compositions

The curable resin compositions of the present invention are particularly useful in applications in which it is desired to have an extended open time at ambient temperatures (e.g., room temperature or 25° C.) but a relative short cure time once the curable resin composition is heated to an elevated temperature (e.g., at least 50° C., 60° C., 70° C. or 80° C., but typically not more than 250° C., 240° C., 230° C., 220° C., 210° C. or 200° C.). In various embodiments of the invention, the curing time (i.e., the time during which the curable resin composition is heated) is at least 0.5, 1, 2, 3, 4 or 5 minutes but not more than 6, 5, 4, 3, 2, 1 or 0.5 hours. For example, the curable resin composition may be heated for a period of time of from 1 minute to 20 minutes. Heating of the curable resin composition may be carried out at a temperature and for a time effective to achieve at least 95%, 96%, 97%, 98%, 99%, 99.5%, 99.9%. 99.99% or even 100% reaction of the monomer initially present in the curable resin. The percent reaction of the monomer may be calculated by analytically measuring the residual unreacted monomer remaining in the cured resin as a percentage of the total composition formulation.

Such applications include, for example, composite systems in which a matrix (such as a matrix of fibers, such as glass, polymeric or carbon fibers, in sheet or tow form, for instance) is impregnated with a curable resin composition to form an impregnated matrix, the impregnated matrix then being formed into a desired configuration and cured to provide a composite article.

For example, the curable resin compositions of the present invention may be utilized in so-called "cured-in-place" pipe systems. A cured-in-place pipe (CIPP) is one of several trenchless rehabilitation methods used to repair existing pipelines, such as water, sewer, gas and chemical pipelines. CIPP is a jointless, seamless, pipe-within-a-pipe with the capability to rehabilitate pipes of varying diameter and configurations, which avoids having to dig up an existing pipeline in order to repair or replace it. In the context of the present invention, a flexible liner comprised of polyester fabric, fiberglass cloth or other type of fabric (woven or non-woven) may be impregnated with the curable resin composition to provide a resin-impregnated liner, which is then inverted or pulled into a damaged pipe (as described, for example, in U.S. Pat. Nos. 4,009,063 and 4,064,211, the entire disclosure of each of which is incorporated herein by reference for all purposes). The liner may be in the form of a laminate, comprised of a layer of a non-woven fabric coated with a thermoplastic sheet material, wherein the non-woven fabric has been impregnated with the curable resin composition. The resin-impregnated liner may be inverted using water or air pressure. Once positioned within the damaged pipe, the resin-impregnated liner may be heated by any suitable method to a temperature effective to initiate curing of the curable composition. For example, hot water or steam may be introduced into the resin-impregnated liner in place within the damaged pipe to provide heat. In certain cases, the ambient temperature within the damaged pipe containing the resin-impregnated liner may be sufficiently high so as to achieve the desired curing. Once cured, the resin-impregnated liner becomes relatively hard and rigid, and thus capable of functioning as a pipe for transport of liquids, gases and the like. The long open times characteristic of the curable resin compositions of the present invention provide a distinct advantage in such cured-in-place pipe systems, as the resin-impregnated liner remains flexible and workable over an extended period of time and allows the resin-impregnated liner to be prepared well in advance of its actual deployment provided it is maintained at a temperature below the temperature at which curing of the curable resin begins to occur at a significant rate. Although the resin-impregnated liner may be refrigerated to even further extend its open time, in certain embodiments of the invention such refrigeration is not necessary due to the curable resin composition having an adequate open time (e.g., 15-, 30-, 45-, 60 minutes or more) even at ambient temperatures of 20-25° C.

Accordingly, the present invention provides a resin-impregnated liner comprised of a liner impregnated with a curable resin composition in accordance with any of the embodiments described herein. A further embodiment of the invention provides a process of making a resin-impregnated liner suitable for use in a cured-in-place pipe method, wherein the process comprises impregnating a liner with a curable resin composition in accordance with any of the embodiments described herein. Also provided by the present invention is a method for lining a cavity of a passageway or pipe having an inner surface comprising a) introducing a resin-impregnated liner into the cavity, wherein the resin-impregnated liner is comprised of a liner impregnated with a curable resin composition in accordance with any of the embodiments described herein and b) introducing steam or hot water into an inner opening of the resin-impregnated liner to force the resin-impregnated liner against the inner surface of the passageway or pipe and to activate curing of the curable resin composition present in the resin-impregnated liner. The resin-impregnated liner is initially flexible, but then is cured to a hard state within the passageway or pipe.

The curable resin compositions of the present invention are also useful in a pultrusion process. As is well known in the art, pultrusion is a combination of a pulling and an extrusion process. A reinforcement structure, which may be fibers, cloth, or other forms, is continuously pulled from spools or the like and impregnated with a matrix material, which in the context of the present invention may be the curable resin material described herein. Such impregnation may be performed in a wet bath, for example. The combined curable resin composition-impregnated reinforcement structure is formed into its final shape by pulling it through a heated die. The final curing of the composite generally also occurs in the downstream portion of the die. The long open times but short cure times of the curable resin composition of the present invention make it particularly well suited for use in such a pultrusion process.

One exemplary embodiment of such a pultrusion process may be described generally as follows. Reinforcing material in fiber form is maintained on racks or spindles or other suitable support. The fiber strands may pass through pre-forming guides to associate the fibers in a preliminary grouping, or the fibers may be pre-associated so as to form woven or braided strands. A tank is provided which holds a volume of the curable resin composition in liquid form (as a resin bath), wherein the curable resin composition is maintained at a temperature at which curing does not take place at a significant rate. A reinforcement material such as a tow formed from the fiber strands is drawn through the resin bath and curable resin composition soaks into the reinforcement material. The wetted tow may be drawn through rollers and a second material guide, which further shapes the composite. The composite tow is shaped within a pultrusion die, where it is also cured by action of one or more heaters. Composite products capable of being manufactured by a pultrusion method include, for example, ladder components, door and window profiles, structural members, cable trays, tool handles, pipe; tubing; rebar; wind turbine blade components, panels; and the like.

In addition to the processes described above, curable resin compositions of the present invention are also useful in a resin transfer molding process. As well known in the art, resin transfer molding consists of a process where a reinforcing material, such as a fiber mat, matrix or pre-form, is placed in matched mold tooling. The tooling is closed and curable resin is injected into the gap, infusing the reinforcing material. The tooling is generally heated and cure is initiated at elevated temperature and under compression of the tooling. A further explanation of conventional resin transfer molding appears in U.S. Pat. No. 4,762,740, which is incorporated herein by reference in its entirety for all purposes. In one type of resin transfer molding, one of the mold halves is a flexible bag or sheet known as a vacuum bag.

One exemplary embodiment of such a resin transfer molding process may be described generally as follows. Reinforcing material in woven fiber form is draped in the matched mold tooling or inserted as a pre-form. The tooling is closed and curable resin is injected into the gap, either in the form of a fully preformulated resin, or after mixing multiple components at the point of injection. The heated tooling compresses the resin/reinforcement system and cure occurs. The tooling is opened, the cured part is removed and the process is repeated.

The curable resin compositions of the present invention are also useful in the fabrication of prepreg sheets, tapes or fabrics, wherein a matrix of fibers (glass fibers, polymeric fibers, carbon fibers, etc., in non-woven or woven form) is impregnated with the curable resin composition. Multiple layers of curable resin composition-impregnated fiber matrix may then be arranged or stratified so that the fibers in the individual layers are aligned in the same or different direction, then molded and cured by pressing or other type of compacting while heating to form a cured composite article.

Within this specification, embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

In some embodiments, the invention herein can be construed as excluding any element or process step that does not materially affect the basic and novel characteristics of the composition or process. Additionally, in some embodiments, the invention can be construed as excluding any element or process step not specified herein.

Although the invention is illustrated and described herein with reference to specific embodiments, the invention is not intended to be limited to the details shown. Rather, various modifications may be made in the details within the scope and range of equivalents of the claims and without departing from the invention.

Various illustrative aspects of the present invention may be summarized as follows:

Aspect 1: A curable resin composition comprised of, consisting essentially of or consisting of:
  a). at least one curable resin;
  b). at least one room-temperature-stable organic peroxide, other than a perketal, which is liquid at 25° C.;

c). at least one room-temperature-stable perketal which is liquid at 25° C.;

d). at least one salt of at least one metal selected from the group consisting of Li, Al, Mg, Co, Fe, Cu, Zn, Ni, Mn, Cr, Sn, Au, Pd and Pt;

e). at least one thiol-functionalized organic compound; and f). at least one free radical trap.

Aspect 2: The curable resin composition of Aspect 1, wherein the at least one thiol-functionalized organic compound includes at least one thiol-functionalized organic compound comprised of two or more thiol functional groups.

Aspect 3: The curable resin composition of Aspect 1 or 2, wherein the at least one thiol-functionalized organic compound includes at least one α-mercaptoacetate or β-mercaptopropionate ester of an alcohol.

Aspect 4: The curable resin composition of Aspect 1, wherein the at least one thiol-functionalized organic compound includes at least one thiol-functionalized organic compound selected from the group consisting of dipentenedimercaptan; ethylcyclohexyldimercaptan; ethylene-1,2-bis-3-mercaptoacetate; ethylene-1,2-bis-3-mercaptopropionate; 1,2,3-propanetrithiol; 1,2,6-hexanetrithiol; pentaerythritolthiol; pentaerythritoltetramercaptoacetate; pentaerythritoltetramercaptopropionate; trimethylol propane tris(3-mercaptopropionate); 1,1,1-propanetriyl tris(mercaptoacetate) and thiolic derivatives of the formula: R—(R'—CH(OH)—CH$_2$—SH)$_n$ wherein R is a linear alkyl group having 3-30 carbon atoms, R' is a linear alkylene group having 3-30 carbon atoms and n is an integer of 2-6.

Aspect 5: The curable resin composition of any of Aspects 1-4, wherein the at least one free radical trap includes at least one nitroxide radical.

Aspect 6: The curable resin composition of Aspect 5, wherein the at least one nitroxide radical is selected from the group consisting of SG-1 free radicals and TEMPO free radicals.

Aspect 7: The curable resin composition of any of Aspects 1-6, wherein the at least one room-temperature-stable organic peroxide, other than a perketal, includes at least one room-temperature-stable perester or percarbonate which is liquid at 25° C.

Aspect 8: The curable resin composition of any of Aspects 1-7, wherein the at least one room-temperature-stable organic peroxide includes at least one room-temperature-stable perester or percarbonate which is liquid at 25° C. selected from the group consisting of t-butyl peroxybenzoate; t-amyl peroxybenzoate; t-butyl peroxyacetate; t-amyl peroxyacetate; t-butyl peroxy-3,5,5-trimethylhexanoate; OO-(t-butyl) O-isopropyl monoperoxycarbonate; OO-(t-butyl) O-(2-ethylhexyl) monoperoxycarbonate; OO-(t-amyl) O-(2-ethylhexyl) monoperoxycarbonate; and polyether poly-t-butylperoxy carbonate.

Aspect 9: The curable resin composition of any of Aspects 1-8, wherein the at least room-temperature-stable perketal includes at least one room-temperature-stable perketal selected from the group consisting of 1,1-di(t-amylperoxy)-cyclohexane; 1,1-di(t-butylperoxy)-cyclohexane; 1,1-di(t-butylperoxy)-3,3,5-trimethylcyclohexane: ethyl 3,3-di(t-amylperoxy)butyrate; and n-butyl-4,4-di(t-butylperoxy) valerate.

Aspect 10: The curable resin composition of any of Aspects 1-9, wherein the at least salt includes at least one transition metal halide.

Aspect 11: The curable resin composition of any of Aspects 1-10, wherein the at least one salt includes at least one zinc halide.

Aspect 12: The curable resin composition of any of Aspects 1-11, wherein the at least one curable resin includes at least one curable resin selected from the group consisting of alkyd resins, unsaturated polyester resins, vinyl ester resins, and (meth)acrylate resins.

Aspect 13: A cured resin composition obtained by curing the curable resin composition of any of Aspects 1-12.

Aspect 14: A composite comprised of the cured resin composition of Aspect 13 and, optionally, at least one reinforcing filler.

Aspect 15: The composite of Aspect 14, wherein the composite is in the form of a pultruded article or a cured-in-place pipe.

Aspect 16: A method of preparing a cured composition, comprising combining at least one curable resin; at least one room-temperature-stable organic peroxide, other than a perketal, which is liquid at 25° C.; at least one room-temperature-stable perketal which is liquid at 25° C.; at least one salt of at least one metal selected from the group consisting of Li, Al, Mg, Co, Fe, Cu, Zn, Ni, Mn, Cr. Sn, Au, Pd and Pt; at least one thiol-functionalized organic compound; and at least one free radical trap to form a curable resin composition and heating the curable resin composition.

Aspect 17: A system useful as a curing system for a curable resin, wherein the system comprises a first component and a second component and wherein the first component comprises at least one room-temperature-stable organic peroxide, other than a perketal, which is liquid at 25° C.; and at least one room-temperature-stable perketal which is liquid at 25° C. and the second component comprises at least one salt of at least one metal selected from the group consisting of Li, Al, Mg, Co, Fe, Cu, Zn, Ni, Mn, Cr, Sn, Au, Pd and Pt and at least one thiol-functionalized organic compound, wherein at least one free radical trap is present in at least one of the first component or the second component.

Aspect 18: An impregnated article comprised of at least one matrix of a reinforcing filler which is impregnated with a curable resin composition in accordance with any of Aspects 1-12.

Aspect 19: A method of making a pultruded, fiber-reinforced, resinous article comprising coating continuous fiber strands with a curable resin composition in accordance with any of Aspects 1-12 to obtained resin-coated continuous fiber strands and pulling the resin-coated continuous glass fiber strands through a shaping zone to provide an elongated structure, the curable resin composition being heated to a temperature effective to initiate curing of the curable resin.

Aspect 20: A method of making a cured-in-place pipe, comprising impregnating a liner with a curable resin composition in accordance with any of Aspects 1-12 to obtain an impregnated liner, placing the impregnated liner material within an existing pipe, and curing the impregnated liner within the existing pipe.

Aspect 21: A method of making a resin transfer molded article, comprising impregnating fiber reinforcement in matched mold tooling with a curable resin composition in accordance with any of Aspects 1-12 to obtain a composite part.

EXAMPLES

Example 1

This example is a comparison of the current invention to a standard, three component initiation system including a freezer storage peroxide as a primary initiator. All formulations were tested using a standard SPI gel test at 80° C. using peak exotherm time as the metric of comparison. The SPI gel test involves placing a test tube containing a defined volume of initiated resin (~25 g) in a heating bath and monitoring the temperature with a thermocouple over the course of the polymer cure. As the polymer cures, the exotherm produced is recorded and gives an indication of the cure time of the formulation. In the examples below (Table 1), the peak time indicates the time at which the maximum temperature is produced by the polymerization exotherm and is used as a relative measure of the cure time in order to compare various formulations. Several loading levels of room-temperature-stable primary and finisher peroxides were evaluated. All reported loading levels are relative to the curable resin weight and indicate the loading of the dilute solutions in cases where neat peroxide is not used. For example, the reported loading of Luperox® 331M80 is the weight of the 80 weight percent solution of 1,1-bis(tert-butylperoxy)cyclohexane in odorless mineral spirits.

PETMP: pentaerythritoltetramercaptopropionate.
Luperox® 10: t-butyl peroxyneodecanoate (Arkema).
Luperox® 575: t-butyl peroxy-2-ethyl hexanoate (Arkema).
Luperox® P: t-butyl perbenzoate (Arkema).
Luperox® TBEC: t-butyl peroxy-2-ethylhexyl carbonate (Arkema).
Luperox® 331M80: 1,1-bis(tert-butylperoxy)cyclohexane, 80 weight percent solution in odorless mineral spirits (Arkema).
Luperox® TAEC: t-amyl peroxy-2-ethylhexyl carbonate (Arkema).
Luperox® JWEB™50: polyether poly(t-butylperoxycarbonate), 50 weight percent solution in ethylbenzene (Arkema).
Luperox® 7M75: t-butyl peroxyacetate, 75 weight percent solution in odorless mineral spirits (Arkema).

TABLE 1

| Peroxide (loading, wt % vs. curable resin) | Accelerator Additives (loading, wt % vs. curable resin) | Peak time, min |
| --- | --- | --- |
| Luperox ® 10 (0.2%) | None | 8.6 |
| Luperox ® 575 (0.24%) | (comparative) | |
| Luperox ® P (0.24%;) | | |
| Luperox ® TBEC (0.35%) Luperox ® 331M80 (0.2%) | PETMP (0.03%) ZnCl₂ (0.01%) | 7.4 |
| Luperox ® TBEC (0.45%) Luperox ® 331M80 (0.2%) | PETMP (0.03%) ZnCl₂ (0.01%) | 6.9 |
| Luperox ® TBEC (0.55%) Luperox ® 331M80 (0.2%) | PETMP (0.03%) ZnCl₂ (0.01%) | 6.9 |
| Luperox ® TBEC (0.35%) Luperox ® 331M80 (0.3%) | PETMP (0.03%) ZnCl₂ (0.01%) | 7.5 |
| Luperox ® TBEC (0.45%) Luperox ® 331M80 (0.3%) | PETMP (0.03%) ZnCl₂ (0.01%) | 6.8 |
| Luperox ® TBEC (0.55%) Luperox ® 331M80 (0.3%) | PETMP (0.03%) ZnCl₂ (0.01%) | 6.8 |
| Luperox ® TBEC (0.35%) Luperox ® 331M80 (0.4%) | PETMP (0.03%) ZnCl₂ (0.01%) | 6.6 |
| Luperox ® TBEC (0.45%) Luperox ® 331M80 (0.4%;) | PETMP (0.03%) ZnCl₂ (0.01%) | 6.4 |
| Luperox ® TBEC (0.55%) Luperox ® 331M80 (0.4%) | PETMP (0.03%) ZnCl₂ (0.01%) | 6.2 |

Example 1 shows that several loading levels of Luperox® TBEC and 331M80 accelerated with PETMP and ZnCl₂ (which are of the invention) have similar or faster cure times compared to a standard, three component peroxide formulation containing a freezer storage peroxide (i.e., LUPEROX 10 which is a peroxide which must be stored in a freezer due to instability issues at room temperature) and which is without accelerator additives.

Example 2

This example is a comparison of several different ambient storage (room-temperature-stable) temperature peresters to the standard three component peroxide formulation discussed in Example 1, using the same methodology as described in Example 1. In all cases except for the three component standard, the room-temperature-stable peroxides are accelerated with PETMP at 0.03% and ZnCl₂ at 0.01% by weight relative to the curable resin weight.

TABLE 2

| Peroxide (loading, wt % vs. curable resin) | Peak time, min |
| --- | --- |
| Luperox ® 10 (0.2%) Luperox ® 575 (0.24%) Luperox ® P (0.24%) (Comparative) | 8.6 |
| Luperox ® P (0.2%) | 7.5 |
| Luperox ® TBEC (0.2%) | 9.6 |
| Luperox ® TALC (0.2%) | 7.5 |
| Luperox ® JWEB ™50 (0.4%) | 9.6 |
| Luperox ® 7M(75 (0.3%) | 6.8 |

Example 2 (Table 2) shows that several different peroxyesters are accelerated by the PETMP and ZnCl₂ and provide cure rates similar and sometimes faster to a standard, three component peroxide formulation based on a freezer storage peroxide (i.e., LUPEROX 10).

Example 3

This example compares several different sulfur-containing additives using the same methodology as described in Example 1. All formulations contained 0.01% ZnCl₂, 0.3% Luperox® TBEC, and 0.4% Luperox® 331M80. All sulfur-containing additives were added to a molar equivalent of 0.03% PETMP.

TABLE 3

| Additive (wt % vs. curable resin) | Peak time (min) |
| --- | --- |
| PETMP (0.03%) | 9.6 |
| TMPTMP (Trimethylolpropane tris(3-mercaptopropionate) (0.02%) | 8.9 |
| EMTA (Ethyl (2-mercapto-1,3-thiazol-4-yl) acetate) (0.1%) | No cure |
| PTTMA (1,1,1-Propanetriyl tris-(mercaptoacetate) (0.2%) | 10.6 |

Example 3 (Table 3) shows that several different mercapto-containing compositions, except for that including EMTA, provided acceptable cure times.

Example 4

This example demonstrates resin open time for several peroxide loading levels with the addition of BlocBuilder® RC-50 (an SG-1 nitroxide free radical trap, available from Arkema) using the same methodology as described in Example 1, with the exception that the bath temperature was set to 35° C. All formulations were accelerated with PETMP at 0.03% and ZnCl₂ at 0.01% relative to the curable resin weight. For this example, the onset of exotherm is an estimate of the extent of the open time of the formulation.

TABLE 4

| Luperox ® TBEC (wt % vs. curable resin) | Luperox ® 331M80 (wt % vs. curable resin) | BlocBuilder ® RC-50 (wt. vs. curable resin wt.) | Onset of exotherm (hours) |
|---|---|---|---|
| 0.30% | 0.3% | 275 ppm | |
| 0.35% | 0.4% | 500 ppm | >8 |
| 0.40% | 0.3% | 275 ppm | 4 |
| 0.45% | 0.4% | 500 ppm | >8 |
| 0.50% | 0.3% | 275 ppm | 3 |
| 0.55% | 0.4% | 500 ppm | >8 |

Example 4 (Table 4) shows that the addition of 500 ppm of BlocBuilder® RC-50 as a free radical trap provided acceptable open times for several loading levels of Luperox® TBEC and 331M80 accelerated with PETMP and $ZnCl_2$.

Example 5 (Prophetic)

In a conventional process for formulating a curable resin using a peroxide package containing a solid peroxide component, the peroxide powder is weighed and mixed into the resin. Care must be taken that the solid peroxide is homogeneously dispersed and dissolved into the resin, requiring mixing for a sufficient period of time and at high enough shear to prevent localized variability in peroxide concentration. Variability in powder flowability and particle size can significantly impact ease of dispersion.

The fully liquid peroxide formulation employed in the present invention is more easily dispersed homogeneously into a resin system. There is no variability due to particle size or powder clumping.

Example 6 (Prophetic)

In a conventional process for formulating a curable resin using a peroxide package containing a freezer and/or refrigerator peroxide (i.e., a peroxide that must be stored in a freezer or refrigerator due to stability issues), the freezer and/or refrigerator peroxide must be removed from cold storage, weighed out to the appropriate loading based on the resin formulation, and returned to cold storage immediately to ensure both peroxide quality and to prevent hazardous decomposition. Failure to return the peroxides promptly to cold storage presents a significant safety hazard.

The room-temperature-stable peroxide formulation used in the present invention does not require cold storage. There is no unexpected loss of quality in the peroxide due to storage of the material at ambient conditions over the course of its shelf life. More importantly, the material will not spontaneously decompose when left at ambient conditions, improving the overall safety of the components of the resin formulation.

Example 7 (Prophetic)

As an example of a conventional pultrusion process using a resin formulation with a peroxide package based on either a solid peroxydicarbonate or freezer storage peroxide, the impregnated fiber can be pulled through a forming die set to a temperature of 130° C. at a rate of 12 inches per minute, forming a cured composite part with acceptable material properties. Production rate as dictated by the pull rate can be modified at a specific temperature by varying the loading level of the peroxides. Increasing the peroxide level can allow for an increase in the pull rate while providing a fully cured part; however, an increase in exotherm or in the total number of radicals generated during polymerization can have a negative impact on mechanical properties or part quality.

The peroxide formulation described in the present invention allows for modification of the cure rate at a given temperature, and therefore the pull speed, by either variation of the peroxide loading, as in the traditional systems described above, or by varying the $PETMP/ZnCl_2$ loading. Manipulation of the cure time through the $PETMP/ZnCl_2$ components has the advantage of potentially minimizing the increase in exotherm at an earlier cure time and keeping the total number of radicals generated constant, minimizing impact on mechanical properties and part quality at increased pull rates.

Example 8 (Prophetic)

As an example of a conventional cured-in-place pipe process using a resin formulation with a peroxide package based on either a solid peroxydicarbonate or freezer storage peroxide, an impregnated pipe liner is inserted into the pipe to be refurbished. The composite liner can then be cured at elevated temperature with hot air, hot water, or steam. Cure times are dictated by heating temperature, the desired final mechanical properties, and residual monomer requirements. These parameters can be adjusted for a given cure time by varying the peroxide loading in the formulation. However, adjusting peroxide levels to modify the cure time can have a negative impact on the final mechanical properties and residual monomer levels.

The peroxide formulation described in the present invention allows for modification of the cure time at a given temperature by either variation of the peroxide loading, as in the traditional systems described above, or by varying the $PETMP/ZnCl_2$ loading. Manipulation of the cure time through the $PETMP/ZnCl_2$ components has the advantage of potentially minimizing the negative impact on final mechanical properties and residual monomer levels by keeping the total radical generation constant and only modifying the onset of radical generation.

Example 9 (Prophetic)

As an example of a conventional resin transfer molding process using a resin formulation with a peroxide package based on either a solid peroxydicarbonate or freezer storage peroxide, reinforcing fiber (in the form of a mat, for example) is placed into heated matched mold tooling and resin is pumped into the tooling gap to infuse the resin, forming a cured composite part with acceptable material properties. Solid peroxydicarbonates or freezer storage peroxides are either dissolved into resin produced by a batch process, or freezer storage peroxides are pumped to a static mixer before injection into the tooling. Particularly for pumped peroxides, extreme care is required to ensure that the system maintains acceptable temperatures to prevent peroxide decomposition before mixing with the resin.

The peroxide formulation described in the present invention allows for a fully pumpable, ambient storage system that removes the requirement of dispersing a solid peroxide into the resin system and mitigates the hazards associated with pumping and storing freezer storage peroxides.

Example 10

This example demonstrated the resin open time with different levels of 4-hydroxy tempo, a nitroxide free radical trap, using the same methodology described in example 4. For this example, all formulations were made with Luperox TBEC at 0.3% and Luperox 331M80 at 0.5% and were accelerated with PETMP at 0.03% and ZnCl2 at 0.01%. All loading levels are relative to the curable resin weight. The amount of 4-hydroxy tempo added to each formulation is listed in Table 5. For this example, the onset of exotherm is an estimate of the extent of open time of the formulation.

TABLE 5

| 4 OH Tempo | Onset of Exotherm |
| --- | --- |
| 10 ppm | 8 hours |
| 15 ppm | 10 hours |

Example 10 (Table 5) shows that an acceptable amount of resin open time can be achieved with the addition of as little as 10 ppm 4 hydroxy tempo.

Example 11

This example demonstrated the efficacy of the system after an extended period of time. For this example, all formulations were made with Luperox TBEC at 0.3% and Luperox 331M80 at 0.5% and were accelerated with PETMP at 0.03% and ZnCl2 at 0.01%. All loading levels are relative to the curable resin weight. The type and amount of the radical trap used for each formulation is listed in Table 6. For this example, a large amount of the formulation was made with a portion of the resin being tested immediately using the standard SPI gel test at 80° C. as described in example 1. The remainder of the resin was allowed to remain at room temperature (approximately 22° C.) for 24 hours after which it was tested again using the standard SPI gel test at 80° C.

TABLE 6

| Free Radical Trap | Amount (ppm) | Peak Time - Initial (Minutes) | Peak Time - 24 hours (Minutes) |
| --- | --- | --- | --- |
| BlocBuilder RC-50 | 500 | 9.37 | 9.53 |
| 4 Hydroxy Tempo | 10 | 9.62 | 8.90 |

Example 11 (Table 6) shows that the resin cure time is not affected by the extended open time.

What is claimed is:

1. A system for curing a curable resin, wherein the system comprises a first component and a second component and wherein the first component comprises at least one room-temperature-stable organic peroxide, other than a perketal, which is liquid at 25° C.; and at least one room-temperature-stable perketal which is liquid at 25° C. and the second component comprises at least one salt of at least one metal selected from the group consisting of Li, Al, Mg, Co, Ni, Cr, Sn, Au, Pd and Pt and at least one thiol-functionalized organic compound, wherein at least one free radical trap is present in at least one of the first component or the second component.

2. The system of claim 1, wherein the at least one thiol-functionalized organic compound includes at least one thiol-functionalized organic compound comprised of two or more thiol functional groups.

3. The system of claim 1, wherein the at least one thiol-functionalized organic compound includes at least one α-mercaptoacetate or β-mercaptopropionate ester of an alcohol.

4. The system of claim 1, wherein the at least one thiol-functionalized organic compound includes at least one thiol-functionalized organic compound selected from the group consisting of dipentene-dimercaptan; ethylcyclohexyldimercaptan; ethylene-1,2-bis-3-mercaptoacetate; ethylene-1,2-bis-3-mercaptopropionate; 1,2,3-propanetrithiol; 1,2,6-hexanetrithiol; pentaerythritolthiol; pentaerythritol tetramercaptoacetate; pentaerythritol tetramercaptopropionate; trimethylol propane tris(3-mercaptopropionate); 1,1,1-propanetriyl tris(mercaptoacetate) and thiolic derivatives of the formula: R—(R'—CH(OH)—CH$_2$—SH)$_n$ wherein R is a linear alkyl group having 3-30 carbon atoms, R' is a linear alkylene group having 3-30 carbon atoms and n is an integer of 2-6.

5. The system of claim 1 wherein the at least one free radical trap includes at least one nitroxide radical.

6. The system of claim 5, wherein the at least one nitroxide radical is selected from the group consisting of SG-1 free radicals and TEMPO free radicals.

7. The system of claim 1, wherein the at least one room-temperature-stable organic peroxide other than a perketal, includes at least one room-temperature-stable perester or percarbonate which is liquid at 25° C. and is selected from the group consisting of t-butyl peroxybenzoate, t-amyl peroxybenzoate, t-butyl peroxyacetate, t-amyl peroxyacetate, t-butyl peroxy-3,5,5-trimethylhexanoate, OO-(t-butyl) O-isopropyl monoperoxycarbonate, OO-(t-butyl) O-(2-ethylhexyl) monoperoxycarbonate, OO-(t-amyl) O-(2-ethylhexyl) monoperoxycarbonate, and polyether poly-t-butylperoxy carbonate.

8. The system of claim 1, wherein the at least room-temperature-stable perketal includes at least one room-temperature-stable perketal selected from the group consisting of 1,1-di(t-amylperoxy)-cyclohexane, 1,1-di(t-butylperoxy)-cyclohexane, 1,1-di(t-butylperoxy)-3,3,5-trimethylcyclohexane, ethyl 3,3-di(t-amylperoxy)butyrate and n-butyl 4,4-di(t-butylperoxy)valerate.

9. The system of claim 1, wherein the at least one salt includes at least one transition metal halide.

10. A cured resin produced using the system of claim 1.

11. A composite comprised of the cured resin of claim 10 and, optionally, at least one reinforcing filler.

12. The composite of claim 11, wherein the composite is in the form of a pultruded article or a cured-in-place pipe.

13. A system for curing a curable resin, wherein the system comprises a first component and a second component and wherein the first component comprises at least one room-temperature-stable organic peroxide, other than a perketal, which is liquid at 25° C.; and at least one room-temperature-stable perketal which is liquid at 25° C. and the second component comprises at least one zinc halide and at least one thiol-functionalized organic compound, wherein at least one free radical trap is present in at least one of the first component or the second component.

14. The system of claim 13, wherein the at least one thiol-functionalized organic compound includes at least one thiol-functionalized organic compound comprised of two or more thiol functional groups.

15. The system of claim 13, wherein the at least one thiol-functionalized organic compound includes at least one α-mercaptoacetate or β-mercaptopropionate ester of an alcohol.

16. The system of claim 13, wherein the at least one thiol-functionalized organic compound includes at least one thiol-functionalized organic compound selected from the group consisting of dipentene-dimercaptan; ethylcyclohexyldimercaptan; ethylene-1,2-bis-3-mercaptoacetate; ethylene-1,2-bis-3-mercaptopropionate; 1,2,3-propanetrithiol; 1,2,6-hexanetrithiol; pentaerythritolthiol; pentaerythritol tetramercaptoacetate; pentaerythritol tetramercaptopropionate; trimethylol propane tris(3-mercaptopropionate); 1,1,1-propanetriyl tris(mercaptoacetate) and thiolic derivatives of the formula: R—(R'—CH(OH)—CH$_2$—SH)$_n$ wherein R is a linear alkyl group having 3-30 carbon atoms, R' is a linear alkylene group having 3-30 carbon atoms and n is an integer of 2-6.

17. The system of claim 13, wherein the at least one free radical trap includes at least one nitroxide radical.

18. The system of claim 17, wherein the at least one nitroxide radical is selected from the group consisting of SG-1 free radicals and TEMPO free radicals.

19. The system of claim 13, wherein the at least one room-temperature-stable organic peroxide other than a perketal, includes at least one room-temperature-stable perester or percarbonate which is liquid at 25° C.

20. The system of claim 19, wherein the at least one room-temperature-stable perester or percarbonate which is liquid at 25° C. is selected from the group consisting of t-butyl peroxybenzoate, t-amyl peroxybenzoate, t-butyl peroxyacetate, t-amyl peroxyacetate, t-butyl peroxy-3,5,5-trimethylhexanoate, OO-(t-butyl) O-isopropyl monoperoxycarbonate, OO-(t-butyl) O-(2-ethylhexyl) monoperoxycarbonate, OO-(t-amyl) O-(2-ethylhexyl) monoperoxycarbonate, and polyether poly-t-butylperoxy carbonate.

21. The system of claim 13, wherein the at least room-temperature-stable perketal includes at least one room-temperature-stable perketal selected from the group consisting of 1,1-di(t-amylperoxy)-cyclohexane, 1,1-di(t-butylperoxy)-cyclohexane, 1,1-di(t-butylperoxy)-3,3,5-trimethylcyclohexane, ethyl 3,3-di(t-amylperoxy)butyrate and n-butyl 4,4-di(t-butylperoxy)valerate.

22. A cured resin produced using the system of claim 13.

23. A composite comprised of the cured resin of claim 22 and, optionally, at least one reinforcing filler.

24. The composite of claim 23, wherein the composite is in the form of a pultruded article or a cured-in-place pipe.

* * * * *